(12) United States Patent
Okamoto et al.

(10) Patent No.: US 9,686,775 B2
(45) Date of Patent: *Jun. 20, 2017

(54) RADIO COMMUNICATION SYSTEM AND RADIO COMMUNICATION METHOD

(71) Applicant: Fujitsu Limited, Kawasaki-shi, Kanagawa (JP)

(72) Inventors: Shinya Okamoto, Fukuoka (JP); Kazuhisa Obuchi, Kawasaki (JP); Hirotoshi Shimizu, Kawasaki (JP); Akihide Otonari, Fukuoka (JP); Yoshinori Soejima, Fukuoka (JP); Miki Yamasaki, Fukuoka (JP); Chiaki Shinohara, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,503

(22) Filed: Apr. 19, 2016

(65) Prior Publication Data

US 2016/0234822 A1  Aug. 11, 2016

Related U.S. Application Data

(60) Continuation of application No. 14/015,499, filed on Aug. 30, 2013, now Pat. No. 9,332,532, which is a (Continued)

(30) Foreign Application Priority Data

Aug. 10, 2007 (JP) ................. 2007-210159

(51) Int. Cl.
*H04W 72/04* (2009.01)
*H04L 29/08* (2006.01)
(Continued)

(52) U.S. Cl.
CPC ....... *H04W 72/0406* (2013.01); *H04L 69/321* (2013.01); *H04W 28/06* (2013.01); *H04W 80/02* (2013.01)

(58) Field of Classification Search
None
See application file for complete search history.

(56) References Cited

U.S. PATENT DOCUMENTS 6,134,246 A  10/2000  Cai et al.
6,901,063 B2  5/2005  Vayanos et al.
(Continued)

FOREIGN PATENT DOCUMENTS

EP       1538763      6/2005
JP    2005521290      7/2005
(Continued)

OTHER PUBLICATIONS

3GPP home page http://www.3gpp.org dated May 21, 2008.
(Continued)

*Primary Examiner* — Min Jung
(74) *Attorney, Agent, or Firm* — Smith, Gambrell & Russell, LLP

(57) ABSTRACT

Instead of adding control information that should be passed on to two or more RLC entities or two or more PDCP entities on the counterpart side to data respectively in two or more RLC entities or two or more PDCP entities at the sending end, control information is added in MAC entity and then distributed to two or more RLC entities in MAC entity on the counterpart side.

2 Claims, 8 Drawing Sheets

Related U.S. Application Data division of application No. 13/032,310, filed on Feb. 22, 2011, now Pat. No. 8,730,997, which is a division of application No. 12/213,911, filed on Jun. 26, 2008, now Pat. No. 7,916,752.

(51) Int. Cl.
*H04W 28/06* (2009.01)
*H04W 80/02* (2009.01)

(56) References Cited

U.S. PATENT DOCUMENTS

| | | | |
|---|---|---|---|
| 7,035,284 B2 | 4/2006 | Willenegger et al. | |
| 7,675,942 B2 | 3/2010 | Lee et al. | |
| 7,751,411 B2 | 7/2010 | Cam et al. | |
| 7,933,292 B2* | 4/2011 | Lee | H04W 72/1284 370/338 |
| 8,081,662 B2 | 12/2011 | Chun | |
| 8,572,289 B1* | 10/2013 | Johnson | H04L 1/0043 709/217 |
| 9,173,223 B2* | 10/2015 | Lee | H04W 72/10 |
| 2001/0043577 A1 | 11/2001 | Barany et al. | |
| 2002/0001314 A1 | 1/2002 | Yi et al. | |
| 2003/0022683 A1 | 1/2003 | Beckmann et al. | |
| 2003/0035423 A1 | 2/2003 | Beckmann et al. | |
| 2005/0185608 A1* | 8/2005 | Lee | H04W 28/06 370/328 |
| 2005/0227695 A1 | 10/2005 | Rasanen et al. | |
| 2006/0171406 A1* | 8/2006 | Kwon | H04L 12/4633 370/419 |
| 2006/0182065 A1 | 8/2006 | Petrovic et al. | |
| 2007/0047451 A1 | 3/2007 | Lohr et al. | |
| 2007/0079207 A1 | 4/2007 | Seidel et al. | |
| 2007/0106924 A1 | 5/2007 | Seidel et al. | |
| 2007/0155388 A1 | 7/2007 | Petrovic et al. | |
| 2007/0189282 A1 | 8/2007 | Lohr et al. | |
| 2008/0069108 A1* | 3/2008 | Yi | H04L 47/10 370/394 |
| 2008/0165805 A1 | 7/2008 | Terry et al. | |
| 2008/0310345 A1 | 12/2008 | Chun et al. | |
| 2008/0310452 A1 | 12/2008 | Vedantham et al. | |
| 2009/0041055 A1 | 2/2009 | Yamasaki et al. | |
| 2009/0046682 A1* | 2/2009 | Kim | H04W 28/06 370/338 |
| 2010/0048198 A1* | 2/2010 | Lee | H04W 72/1284 455/422.1 |
| 2010/0184424 A1* | 7/2010 | Yi | H04W 28/06 455/422.1 |
| 2010/0189026 A1 | 7/2010 | Lee et al. | |
| 2011/0003600 A2 | 1/2011 | Beckmann et al. | |
| 2014/0192748 A1 | 7/2014 | Lee et al. | |

FOREIGN PATENT DOCUMENTS

| | | |
|---|---|---|
| JP | 2005521293 | 7/2005 |
| JP | 2005525745 | 8/2005 |
| JP | 20060020044 | 1/2006 |
| JP | 2006508554 | 3/2006 |
| JP | 2006191554 | 7/2006 |
| JP | 2007028653 | 2/2007 |
| JP | 2007502557 | 2/2007 |
| JP | 2007502558 | 2/2007 |
| JP | 2007502559 | 2/2007 |
| JP | 2007082192 | 3/2007 |
| JP | 2007151158 | 6/2007 |

OTHER PUBLICATIONS

Notice of Reasons for Rejection dated Aug. 11, 2009 issued in corresponding Japanese Patent Application No. 2007-210159.
PDCP SN removal in LTE data transmission, Alcatel-Lucent (http://webstats.3gpp.org/ftp/tsg_ran/WG2_RL2 TSGR2_58bis/Docs/R2-072692.zip) Jun. 25-29, 2007.
Japanese Patent Office Action issued in Japanese Patent Application No. 2007-210158 dated Jun. 23, 2009.
Universal Mobile Telecommunications System (UMTS); Radio Interface Protocol Architecture (3 GPP TS 25.301 version 7.2.0 Release 7) Jun. 2007.
NTT DoCoMo MAC PDU Structure for LTE; R2-072716 XP-002513783 Jun. 25-29, 2007.
Universal Mobile Telecommunications Systems (UMTS); Medium Access Control (MAC) Protocol Specification (3GPP TS 25.321 version 7.3.0 Release 7) Dec. 2006.
Extended European Search Report for Application No. 08157577.1-2413/2037708 dated Feb. 20, 2009.
Notice of Allowance dated Nov. 22, 2010 received in U.S. Appl. No. 12/213,911.
Notice of Allowance dated Jun. 1, 2010 received in U.S. Appl. No. 12/213,911.
Non-Final office action dated Dec. 18, 2009 received in U.S. Appl. No. 12/213,911.
Final Office Action dated May 6, 2013 received in U.S. Appl. No. 13/032,310.
Non-final office action dated Dec. 17, 2012 received in U.S. Appl. No. 13/032,310.
Notice of Allowance dated Jan. 24, 2014 received in U.S. Appl. No. 13/032,310.

* cited by examiner

RADIO COMMUNICATION SYSTEM AND RADIO COMMUNICATION METHOD

CROSS-REFERENCE TO RELATED APPLICATION

This application is a continuation of U.S. application Ser. No. 14/015,499, filed Aug. 30, 2013, which is a divisional of U.S. application Ser. No. 13/032,310, filed Feb. 22, 2011, which is a divisional of U.S. application Ser. No. 12/213,911, filed Jun. 26, 2008, which are hereby incorporated by reference herein in their entirety.

BACKGROUND OF THE INVENTION

Field of the Invention

The present invention relates to a radio transmission apparatus, a radio receiving apparatus, a radio communication apparatus, a radio transmission method, and a radio receiving method.

Description of the Related Art

Recently, there is widely adopted the protocol of a radio communication system that is called 3G (3rd generation).

There are some developmental stages also in this 3G. The cellular phone that adopts the protocol that is called 3.5G or HSDPA in which the transmission rate is sped up further, as well as the original 3G that is adopted in FOMA and the like, has appeared, too. In addition, the protocol that is called Super3G or 3.9G is examined now.

The protocol in the radio communication system of group of this 3G is divided into two or more layers, and layer 2 of those layers is composed of three sub-layers of MAC (Medium Access Control), RLC (Radio Link Control) and PDCP (Packet Date Convergence Protocol). FIG. 1 is a construction view of a protocol.

Layer 1 is a layer that is called a physical layer, and the layer 1 is a part which takes charge of an actual communication. Layer 2, which is the superorddnate position layer, is composed of three sub-layers of MAC, RLC and PDCP. Here, the mass of one processing function arranged in one layer or one sub-layer is called entity (entity). The PDCP entity and the RLC entity correspond to each LCH (Logical Channel: logical channel) and exist by the number of LCH to be used, and perform transmitting-receiving of PDU (Protocol Data Unit) having a one-to-one correspondence. Here, in the PDCP entity, the processing such as the ciphering of data is done in 3.9G (Super3G), and in the RLC entity, the processing such as the control of retransmission of data is done.

Moreover, in the MAC entity, PDU that has been forwarded from each RLC entity through each LCH is integrated into one PDU, and the integrated PDU is forwarded through TRCH (Transport Channel) to the layer 1 that is the subordinate position layer.

At the receiving side, the MAC entity divides the PDU, which is transferred from the layer 1 through the TRCH, into one or two or more PDU, and transfers the divided individual PDU through individual LCH to individual RLC entity.

Here, in individual PDU, the mechanism that information can be exchanged with the opposing side by giving not only the user data but also the control information necessary for the entity on the opposing side is being examined by 3GPP (3rd Generation Partnership Project).

FIG. 2 is a view showing an example of data flow where control information is given.

Here, in the RLC entity of LCH#1, header H and control information CONT are added to SDU (Source Date Unit) received from the PDCP entity, and it is sent to the MAC entity in form of new SDU. In the RLC entity of LCH#2, only the header H is added to SDU received from the PDCP entity, and it is sent to the MAC entity in form of new SDU.

In the MAC entity, SDU received from the RLC entity of LCH#1 and SDU received from the RLC entity of LCH#2 are integrated, And header H is added in addition, so that one PDU is formed and is transferred to the layer 1.

The layer 1 transmits on a radio basis to the PDU.

The control information CONT added in the RLC entity of LCH#1 is referred to by the associated entity at the receiving side, that is, the RLC entity of LCH#1 at the receiving side, but not referred to by the RLC entity of LCH other than LCH#1 at the receiving side, and entity of other layer or sub-layer, that is, the entity of the layer 1, the MAC entity, and the PDCP entity.

It is examined by 3GPP standardization to be able to give not only the user data but also the control information with the opposing entity to sending and receiving PDU, and, as a result, the exchange of the control information becomes possible between each entity. This is suitable when peculiar control information is exchanged between the opposing entities.

However, when it is intended that the control information of the same content, such as hand-over information and reset information, is transmitted or received. not only between entities in which some LCH in the same sub-layer opposes, but all entities in the same sub-layer or all entities in layer 2, as for the current state, the control information on each entity will be given when PDU is made by each entity, and the control information spreads consequentially in all entities, but as sending and receiving PDU between the MAC entity and the layer 1, the size grows by the amount of the control information, and it imposes a burden on a radio transmission.

FIG. 3 is a view useful for understanding an example where the control information on the Same content is transmitted to all entities of RLC sub-layer.

As shown in FIG. 3, at the transmitting side, in all of the RLC entities, header H and control information are added to the PDU and then transmitted to MAC entity. And, in the MAC entity, the header H is added and then transferred to the layer 1, and transmitted on a radio basis.

In this case, control information, which is added in the individual RLC entity, is referred to by RLC entity of the associated LCH on the opposing side. Thus, the control information is able to be delivered to all RLC entities on the opposing side. However, because two or more same control information will exist, the traffic increase of a radio communication might be invited.

SUMMARY OF THE INVENTION

The present invention has been made in view of the above circumstances and provides a radio transmission apparatus and a radio transmission method wherein when it is necessary to transmit same control information to two or more entities on opposing side, control information to be passed on to two or more entities on opposing side is transmitted suppressing amount of traffic of radio communication by suppressing data size of radio transmission, a radio receiving apparatus and a radio receiving method each having a function of passing on one control information to two or more entities, and a radio communication apparatus equipped with the radio transmission apparatus and the radio receiving apparatus.

A radio transmission apparatus including:

two or more first data processing sections which are placed at associated identical first sub-layers, respectively, of a data transmission path of individual logical channel of two or more logical channels, wherein the first data processing section sends out data in such a way that first control information to be transferred to a counterpart entity that is placed at a sub-layer that is identical with the first sub-layer of a receiving side is added to data received from the individual logical channel;

a second data processing section that is placed at a second sub-layer that mediates data transmission between a transport channel and two or more logical channels, wherein the second data processing section sends out data to the transport channel in such a way that data received from two or more logical channels are integrated, and second control information to be transferred to a counterpart entity that is placed at a sub-layer that is identical with the second sub-layer of the receiving side is added;

and a data transmission section that receives data transmitted from the second data processing section via the transport channel and transmits the received data by radio; and a control decision section that decides that it is a scene that identical first control information is transmitted to two or more opposing entities which are placed at a sub--layer that is identical with the first sub-layer of the receiving side, wherein the second data processing section sends out data to the transport channel in such a way that data received from two or more logical channels are integrated, and the second control information to be treated in a counterpart entity which is placed at a sub-layer identical with the second sub-layer of the receiving side, the second control information being identical with the first control information in content, is added, in a. scene that identical first control information is transmitted to two or more opposing entities which are placed at a sub-layer that is identical with the first sub-layer of the receiving side.

In the radio transmission apparatus according to the present invention as mentioned above, it is preferable that the second data processing section sends out data to the transport channel in such a way that data received from two or more logical channels are integrated, and the second control information describing that the second control information is control information which is to be treated in a counterpart entity which is placed at a sub-layer identical with the second sub-layer of the receiving side, the second control information being identical with the first control information in content, is added, in a scene that identical first control information is transmitted to two or more opposing entities which are placed at a sub-layer that is identical with the first sub-layer of the receiving side.

In the radio transmission apparatus according to the present invention as mentioned above, it is acceptable that the first data processing section is MAC entity, the second data processing section is one entity of RLC entity and PDCP entity, and the control decision section is RRC entity.

According to the radio transmission apparatus of the present invention, instead of adding the same control information (first control information) by two or more first data processing sections (two or more RLC entities or PDCP entities), the second data processing section (MAC entity) adds the second control information which is the same as the first control information in content and transfers the same to the data transmission section (layer 1). This feature makes it possible to transmit control information to the opposing end without increasing traffic volume.

A radio receiving apparatus including:

a data receiving section. that receives data transmitted by radio and transfers the received data to a transport channel;

a third data processing section that is placed at a third sub-layer that mediates data transmission between the transport channel and two or more logical channels, wherein the third data processing section operates in accordance with third control information which is added to data received from the transport channel, and the third data processing section removes the third control information from the data and separates the data into data being associated with individual logical channel so as to distribute the data to the individual logical channel; and two or more fourth data processing sections which are placed at associated identical first sub-layers, respectively, of a data transmission path of individual logical channel of two or more logical channels, wherein the fourth data processing section operates in accordance with fourth control information which is added to data received from the individual logical channel, and the fourth data processing section removes the fourth control information from the data and transmits the data to the individual logical channel, wherein when the third control information is control information that controls operation of the two or more fourth data processing sections, the third data processing section removes the third control information from the received data from the transport channel and separates the data into data being associated with individual logical channel, and the third data processing section distributes the data to the individual logical channel in such a way that fourth control information which is to be treated in individual one of the two or more fourth data processing sections, the fourth control information being identical with the third control information in content, is added to the data separated for the individual logical channel.

In the radio receiving apparatus according to the present invention as mentioned above, it is preferable that the third data processing section decides whether the third control information is control information which controls operation of the two or more fourth data processing sections, in accordance with description content of the third control information.

In the radio receiving apparatus according to the present invention as mentioned above, it is acceptable that the third data processing section is MAC entity, and the fourth data processing section is one entity of RLC entity and PDCP entity.

A radio communication apparatus that is provided with the radio transmission apparatus according to the present invention, and the radio receiving apparatus according to the present invention.

A radio transmission method in a radio transmission apparatus including:

two or more first data processing sections which are placed at associated identical first sub-layers, respectively, of a data transmission path of individual logical channel of two or more logical channels, wherein the first data processing section sends out data in such a way that first control information to be transferred to a counterpart entity that is placed at a sub-layer that is identical with the first sub-layer of a receiving side is added to data received from the individual logical channel;

a second data processing section that is placed at a second sub-layer that mediates data transmission between a transport channel and two or more logical channels, wherein the second data processing section sends out data to the transport channel in such a way that data received from two or more logical channels are integrated, and second control information to be transferred to a counterpart entity that is placed at a sub-layer that is identical with the second sub-layer of the receiving side is added;

and a data transmission section that receives data transmitted from the second data processing section via the transport channel and transmits the received data by radio;

wherein the radio transmission method comprises a first step of deciding whether a scene that identical first control information is transmitted to two or more opposing entities which are placed at a sub-layer that is identical with the first sub-layer of the receiving side; and a second step in which the second data processing section sends out data to the transport channel in such a way that data received from two or more logical channels are integrated, and the second control information to be treated in a counterpart entity which is placed at a sub-layer identical with the second sub-layer of the receiving side, the second control information being identical with the first control information in content, is added, in a scene that identical first control information is transmitted to two or more opposing entities which are placed at a sub--layer that is identical with the first sub-layer of the receiving side.

A radio receiving method in a radio receiving apparatus including:

a data receiving section that receives data transmitted by radio and transfers the received data to a transport channel;

a third data processing section that is placed at a third sub-layer that mediates data transmission between the transport channel and two or more logical channels, wherein the third data processing section operates in accordance with third control information which is added to data received from the transport channel, and the third data processing section removes the third control information from the data and separates the data into data being associated with individual logical channel so as to distribute the data to the individual logical channel; and two or more fourth data processing sections which are placed at associated identical first sub-layers, respectively, of a data transmission path of individual logical channel of two or more logical channels, wherein the fourth data processing section operates in accordance with fourth control information which is added to data received from the individual logical channel, and the fourth data processing section removes the fourth control information from the data and transmits the data to the individual logical channel, wherein the radio receiving method has a step in which when the third control information is control information that controls operation of the two or more fourth data processing sections, the third data processing section removes the third control information from the data received from the transport channel and separates the data into data being associated with individual logical channel, and the third data processing section distributes the data to the individual logical channel in such a way that fourth control information which is to be treated in individual one of the two or more fourth data processing sections, the fourth control information being identical with the third control information in content, is added to the data separated for the individual logical channel.

According to the present invention as mentioned above, it is possible to transmit the same content of control information to two or more entities upon suppression of traffic volume.

DETAILED DESCRIPTION OF THE INVENTION

Embodiments of the present invention will be described with reference to the accompanying drawings.

Figure 4:
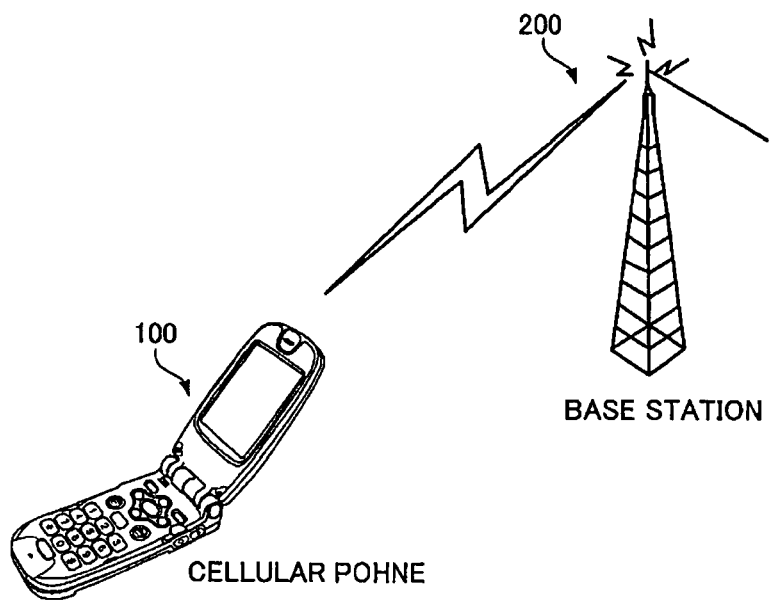
FIG. 4 is a typical illustration of an example of a communication system to which an embodiment of the present invention is applied.

FIG. 4 is a typical illustration of an example of a communication system to which an embodiment of the present invention is applied.

FIG. 4 shows a cellular phone 100 and a base station 200 that performs a radio communication with the cellular phone 100. In an actual telecommunication system, a lot of cellular phones and a lot of base stations exist, and a lot of exchanges etc. exist in addition, too. However, only a minimum composition necessary for the explanation of the present embodiment is shown in the figure here.

When a radio communication is performed between the cellular phone 100 and base station 200, the base station 200 becomes a receiving side when the cellular phone 100 is positioned on a sending side, and the cellular phone 100 becomes a sending side when the base station 200 is positioned on the sending side. That is, the composition at the sending end. and the composition of the receiving side are prepared for in both the cellular phone 100 and the base station 200.

Figure 5:
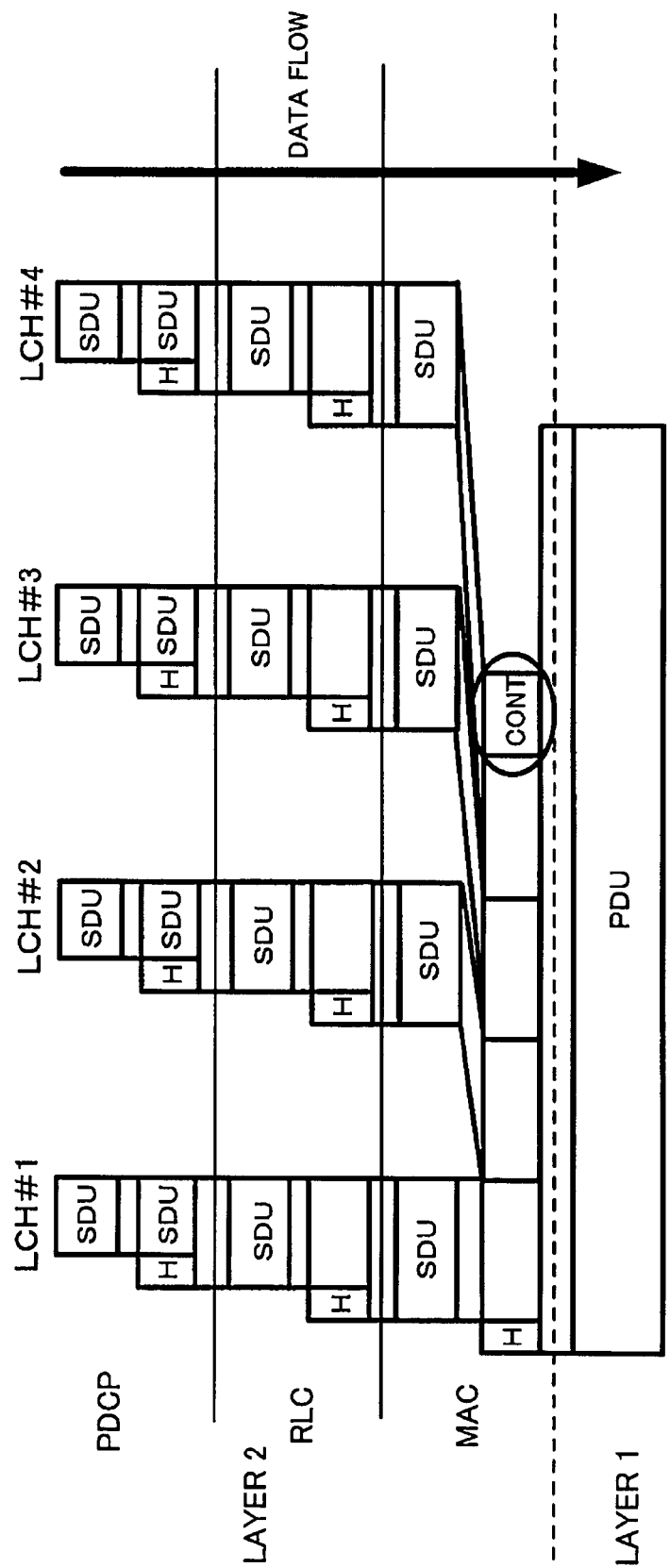
FIG. 5 is a view showing an example of the data flow at the end of a transmission.

FIG. 5 is a view showing an example of the data flow at the end of a transmission.

FIG. 5 shows a scene in which the sane control information is passed on to four RLC entities disposed on logical channels of LCH#1, LCH#2, LCH#3, and LCH#4, at the receiving end, which oppose to four RLC entities disposed on logical channels of LCH#1, LCH#2, LCH#3, and LCH#4.

Figure 1:
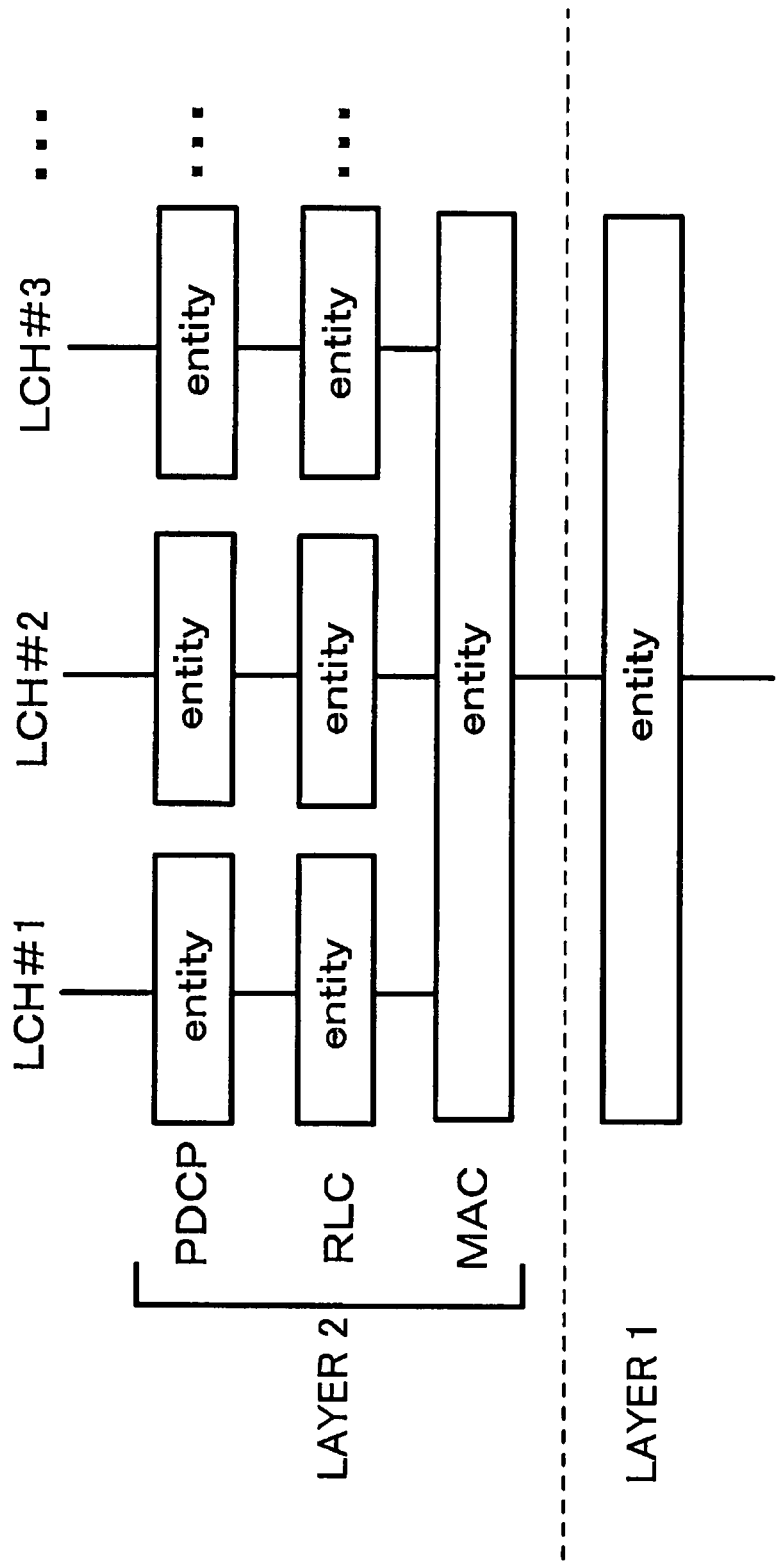
FIG. 1 is a construction view of a protocol.
Figure 2:
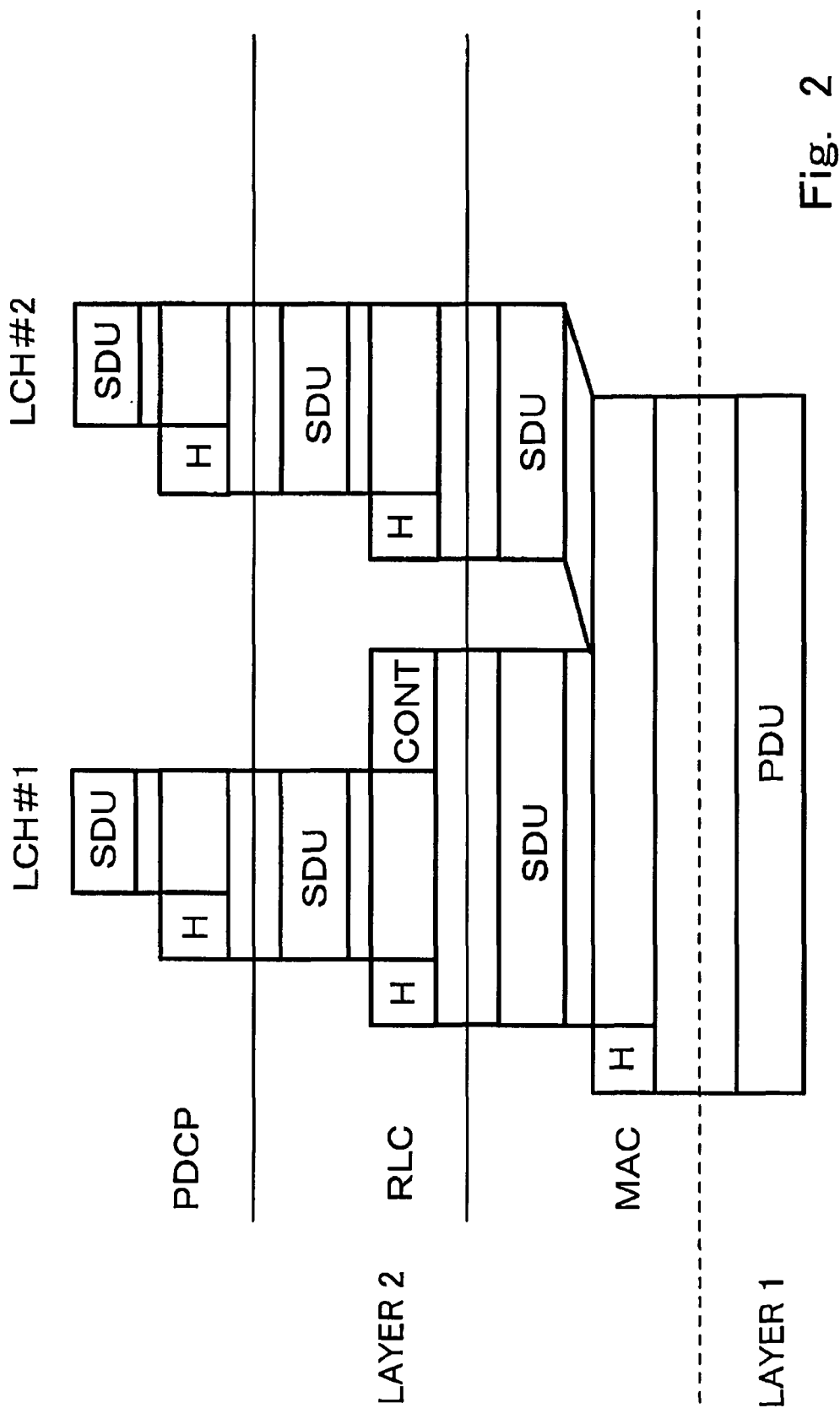
FIG. 2 is a view showing an example of data flow where control information is given.
Figure 3:
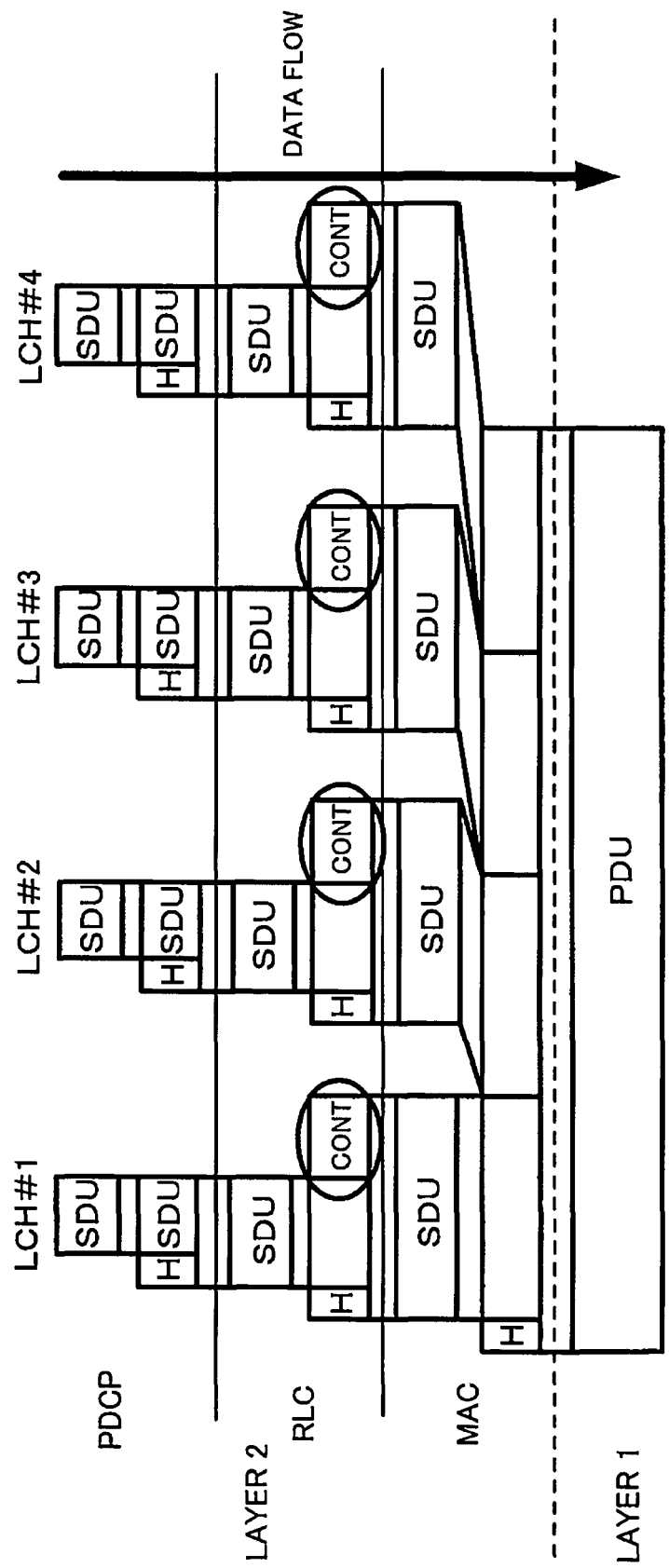
FIG. 3 is a view useful for understanding an example where the control information on the same content is transmitted to all entities of RLC sub-layer.

According to the example shown in FIG. 3, the control information is given to individual one of four RLC entities. To the contrarily, according to the example shown in FIG. 5, the control information is not given to individual one of four RLC entities. Instead, control information CONT, which is the same content as the control information, is given to the MAC entity and then transmitted to the layer 1. At this time, in the MAC entity, the given control information contains information that indicates the destination (Four RLC entities of LCH#1-LCH#4 on the opposing side in the example shown here) to be referred to in this control information.

As seen from FIG. 5, a giving of the control information in the MAC entity makes it possible to reduce the size of data to be transmitted and suppress traffic volume as compared with a case where the control information is given in the individual one of two or more RLC entities, as shown. in FIG. 3.

Figure 6:
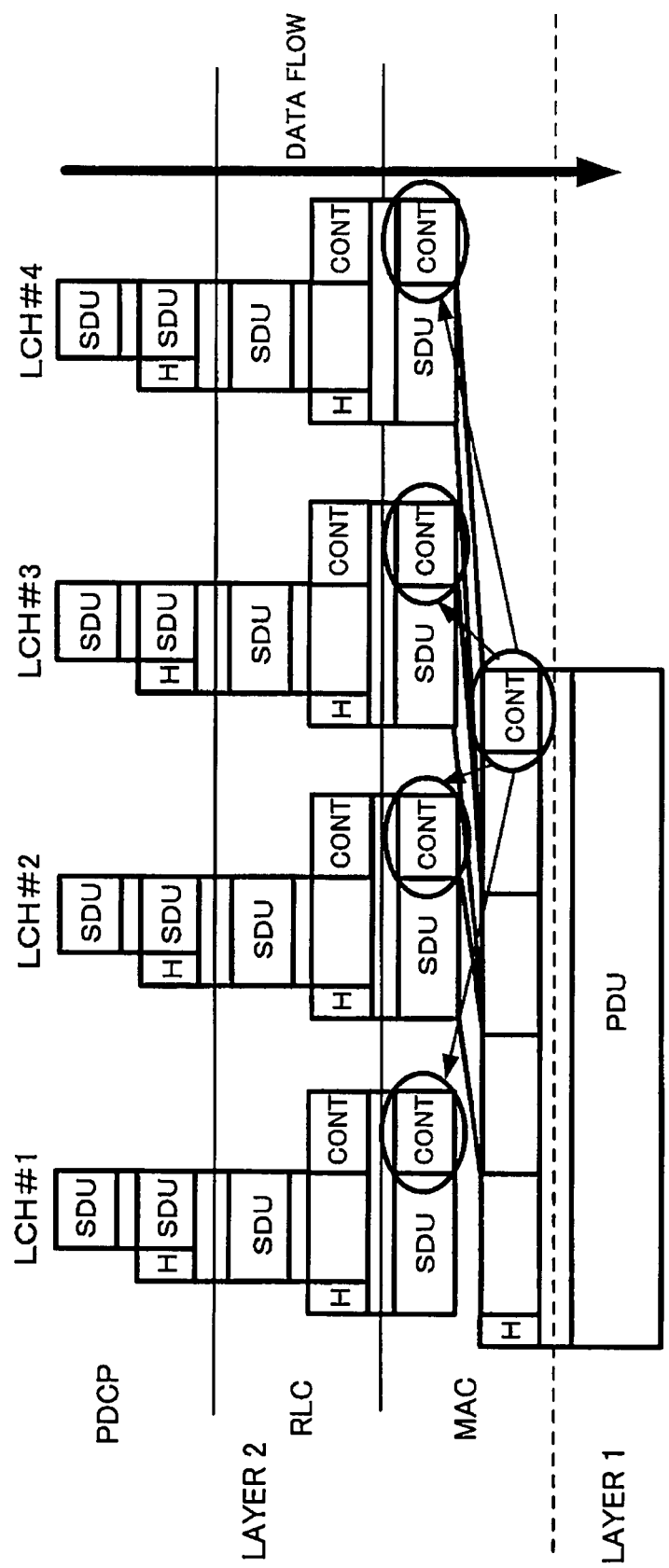
FIG. 6 is a view showing an example of the data flow at the end of a reception.

FIG. 6 is a view showing an example of the data flow at the end of a reception.

In the MAC entity, the control information CONT is removed once from the PDU which is received from the layer 1, and then separated into SDU's to be transferred to RLC entities of individual LCH's. In the MAC entity, when the control information is control information addressed to me (MAC entity) referring to the removed control information, it operates in accordance with the control information. Here, it is assumed that the control information is control information to be referred to in the RLC entity of individual LCH. In this case, the control information is added to individual SDU divided to be transferred to the RLC entity of individual LCH. The RLC entity of individual LCH refers to the control information added to the received SDU and operates in accordance with the control information.

An adoption of the data flow as shown in FIG. 5 and FIG. 6 makes it possible to transfer the same control information to two or more entities upon suppression. of the traffic volume on the radio communication.

Figure 7:
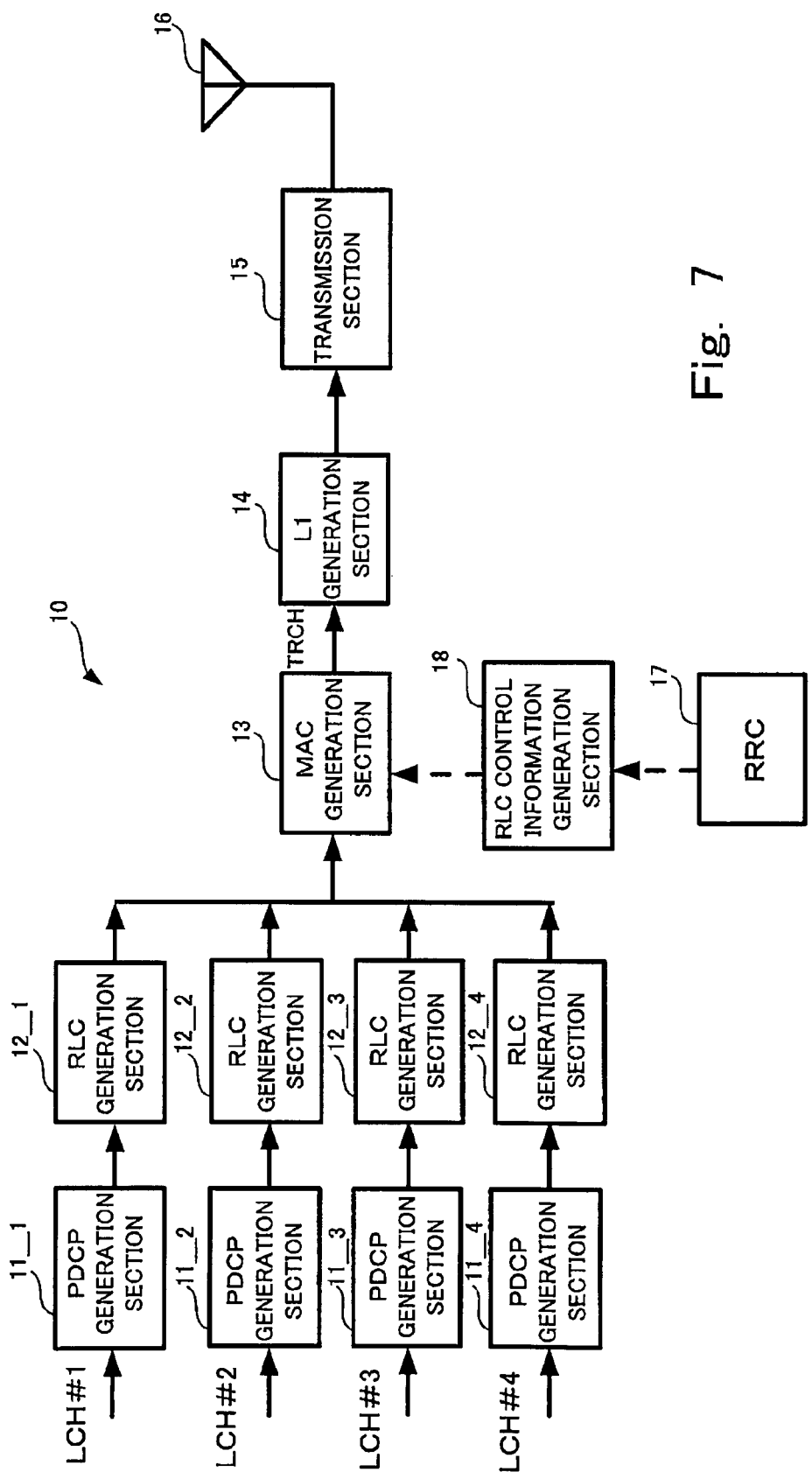
FIG. 7 is a block diagram of a radio transmitting apparatus according to an embodiment of the present invention.

FIG. 7 is a block diagram of a radio transmitting apparatus according to an embodiment of the present invention.

A radio transmitting apparatus 10 has four logical channels LCH#1, LCH#2, LCH#3,and LCH#4.0 Those logical channels LCH#1, LCH#2, LCH#3, and LCH#4 are provided with PDCP generation sections 11_1, 11_2, 11_3, and 11_4, respectively, and RLC generation sections 12_1, 12_2, 12_3, and 12_4, respectively. Further, there is prepared a MAC generation section 13 between the logical channels LCH#1, LCH#2, LCH#3, and LCH#4 and a transport channel TRCH.

The PDCP generation sections 11_1, 11_2, 11_3, and 11_4 apply ciphering processing to data received from the logical channels LCH#1, LCH#2, LCH#3, and LCH#4, respectively, and transfer the thus processed data to the RLC generation sections 12_1, 12_2, 12_3, and 12_4, respectively. The RLC generation sections 12_1, 12_2, 12_3, and 12_4 manage a transfer of data of the logical channels LCH#1, LCH#2, LCH#3, and LCH#4 to the MAC generation section 13 in such a way that the RLC generation sections 12_1, 12_2, 12_3, and 12_4 transfer the data received from the PDCP generation sections 11_1, 11_2, 11_3, and 11_4 to the MAC generation section 13 when the MAC generation section 13 offers a state that the MAC generation part 13 can receive the data, and moreover, even in case of the data passed to the MAC generation section 13 once, when there is a demand of sending again from the MAC generation section 13 due to the failure of the communication and the like, data With the demand is passed to the MAC generation section 13.

The MAC generation section 13 integrates the data received from four RLC generation sections 12_1, 12_2, 12_3, and 12_4 into one data, and transfers the integrated data to a L1 generation section. 14 where the generated PDU is arranged in a layer 1 (physical layer). In the L1 generation section 14, data received from the MAC generation section 13 is converted into an electric transmission signal, and then transmitted on a radio basis in the air by a transmission section 15 through an antenna 16.

The PDCP generation sections 11_1, 11_2, 11_3, and 11_4, Which are disposed on the logical channels LCH#1, LCH#2, LCH#3, and LCH#4, respectively, are able to transmit control information to PDCP analyzing sections 21_1, 21_2, 21_3, and 21_4 (refer to FIG. 8) of the corresponding logical channels, respectively, of the opposing receiving side. When there is control information to be transmitted to the opposing side, the PDCP generation sections 11_1, 11_2, 11_3, and 11_4 transmit data to the RLC generation sections 12_1, 12_2, 12_3, and 12_4 on the corresponding logical channels, respectively, upon addition of the control information.

In a similar fashion, the RLC generation. sections 12_1, 12_2, 12_3, and 12_4, which are disposed on the logical channels LCH#1, LCH#2, LCH#3, and LCH#4, respectively, are able to transmit control information to RLC analyzing sections 22_1, 22_2, 22_3, and 22_4 (refer to FIG. 8) of the corresponding logical channels, respectively, of the opposing receiving side. When there is control information to be transmitted to the opposing side, the RLC generation sections 12_1, 12_2, 12_3, and 12_4 transmit data to the MAC generation section 13, upon addition of the control information.

Moreover, in a similar fashion, the MAC generation section 13 is also able to transmit control information to MAC analyzing section 23 (refer to FIG. 8) of the opposing side. When there is control information to be transmitted to the MAC analyzing section 23, the MAC generation section 13 transmits data to L1 generation section 13, upon addition of the control information.

it happens that the MAC generation section 13 treats the control information to be transmitted to the RLC analyzing sections 22_1, 22_2, 22_3, and 22_4, but not the control information used directly in the MAC analyzing section 23. More in detail, RRC (Radio Resource Control) 17 manages the scene where the control information is transmitted to the opposing side. When RLC control information generation section 18 receives notice that it is a scene that the same control information should be transmitted from the RRC 17 to all the RLC analyzing sections 22_1, 22_2, 22_3, and 22_4 of the opposing side, the RLC control information generation section 18 generates control information to be transmitted to all the RLC analyzing sections 22_1, 22_2, 22_3, and 22_4 and transfers the same to the MAC generation section 13. At that time, this control information stores therein that it is control information to be transmitted to all the RLC analyzing sections 22_1, 22_2, 22_3, and 22_4 of the opposing side.

When the MAC generation section 13 receives the control information from the RLC control information generation section 18, the MAC generation section 13 integrates data received from the RLC generation sections 12_1, 12_2, 12_3, and 12_4 and adds the received control information, and then transfers it to the L1 generation section 14. The data transferred to the L1 generation section 14 is converted into the transmission signal, and then transmitted on a radio basis in the air by the transmission section 15 through the antenna 16.

Figure 8:
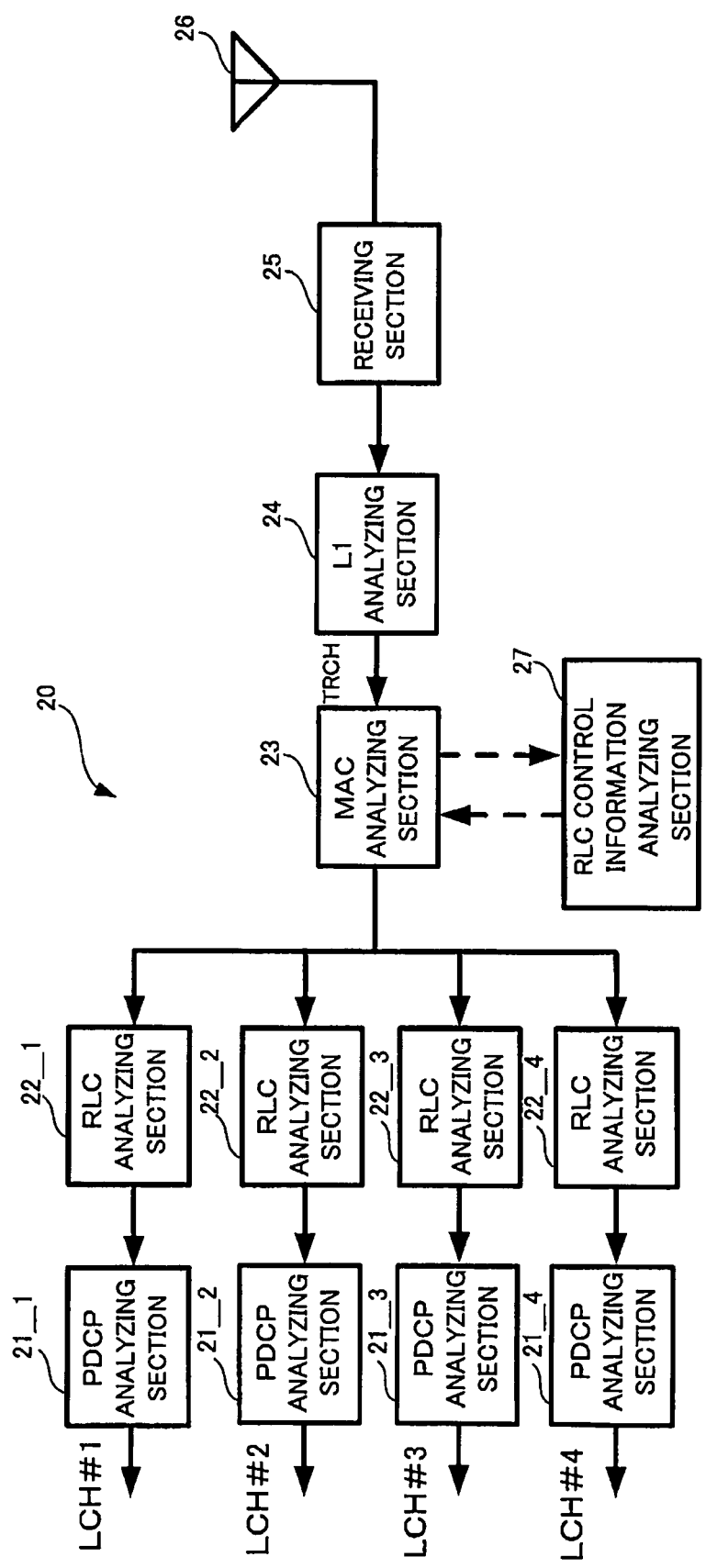
FIG. 8 is a block diagram of a radio receiving apparatus according to an embodiment of the present invention.

FIG. 8 is a block diagram of a radio receiving apparatus according to an embodiment of the present invention.

In a similar fashion to that of the radio transmitting apparatus 10 shown in FIG. 7, a radio receiving apparatus 20 also has four logical channels LCH#1, LCH#2, LCH#3, and LCH#4. Those logical channels LCH#1, LCH#2, LCH#3, and LCH#4 are provided with four PDCP analyzing sections 21_1, 21_2, 21_3, and 21_4, respectively, and four RLC analyzing sections 22_1, 22_2, 22_3, and 22_4, respectively.

Further, there is prepared a MAC analyzing section 23 between the logical channels LCH#1, LCH#2, LCH#3, and LCH#4 and a transport channel TRCH.

A receiving section 25 receives a radio signal through an antenna 26. A receiving signal, which is obtained by the receiving, is transmitted to a L1 analyzing section 24 constituting layer 1 (physical layer). The L1 analyzing section 24 converts the electrical receiving signal to data of format to be treated inside the apparatus. The thus converted data is transmitted to the MAC analyzing section 23.

The MAC analyzing section 23 distributes the data received from the L1 analyzing section 24 to the RLC analyzing sections 22_1, 22_2, 22_3, and 22_4. Each RLC analyzing sections 22_1, 22_2, 22_3, and 22_4 check whether the data that each should receive becomes complete. When there is data that has not been received yet, retransmission of the data is demanded from the opposing RLC generation section. When the data that should be received becomes complete, it is transmitted to the PDCP analyzing sections 21_1, 21_2, 21_3, and 21_4 of the same logical channel. Each PDCP analyzing sections 21_1, 21_2, 21_3, and 21_4 performs deciphering processing to the ciphering data, and it is sent off to each logical channel.

Retransmission demand processing is performed by the MAC analyzing section 23 as well as the RLC analyzing sections 22_1, 22_2, 22_3, and 22_4, if there is insufficient data at the processing stage in the MAC analyzing section 23, and also the retransmission demand processing is performed by the L1 analyzing section 24 too when the receiving signal is not received properly.

When the received data includes control information directed to the MAC analyzing section 23, which is added in the MAC generation section 13 on the opposing side, the MAC analyzing section 23 performs operation in accordance with the control information. When data, which are received by the RLC analyzing sections 22_1, 22_2, 22_3, and 22_4, include control information which is added in the RLC generation sections 12_1, 12_2, 12_3, and 12_4 of the opposing side, the RLC analyzing sections 22_1, 22_2, 22_3, and 22_4 perform the operation according to the control information. When data, which are received by the PDCP analyzing sections 21_1, 21_2, 21_3, and 21_4, include control information which is added in the PDCP generation sections 11_1, 11_2, 11_3, and 11_4 of the opposing side, the PDCP analyzing sections 21_1, 21_2, 21_3, and 21_4 perform the operation according to the control information.

As explained in conjunction with FIG. 7, it happens that the MAC generation section 13 adds the control information for all the RLC analyzing sections 22_1, 22_2, 22_3, and 22_4 as well as the control information for the MAC analyzing section 23. Thus, the radio receiving apparatus 20 shown in FIG. 8 has an RLC control information analyzing section 27. When control information is added to the data which is received by the MAC analyzing section 23, the control information is transferred to the RLC control information analyzing section 27. The RLC control information analyzing section 27 analyzes whether the received control information is concerned with the control information for the MAC analyzing section 23 or the control information for all the RLC analyzing sections 22_1, 22_2, 22_3, and 22_4. The MAC analyzing section 23 is notified of the analyzing result. When the control information is concerned with control information to be processed in the MAC analyzing section 23, the MAC analyzing section 23 operates in accordance with the control information. On the other hand, when the control information is concerned with control information to be transmitted to the RLC analyzing sections 22_1, 22_2, 22_3, and 22_4, the MAC analyzing section 23 adds the control information to individual data separated every logical channel, and transmits those to the RLC analyzing sections 22_1, 22_2, 22_3, and 22_4, respectively. The RLC analyzing sections 22_1, 22_2, 22_3, and 22_4 operate in accordance with the control information added to data received from the MAC analyzing section 23.

According to the radio transmission apparatus and the radio receiving apparatus as mentioned above, the control information that should be passed on to two or more PLC analyzing sections is sufficient by one, and the amount of traffic of a radio communication is suppressed and then the control information can be passed on to two or more RLC analyzing sections.

While the above-mentioned explanation is concerned With the control information to be transmitted to the RLC analyzing sections, it is similar also in a case where the same control information. is transmitted to all the PDCP analyzing sections 21_1, 21_2, 21_3, and 21_4. In this case, however, it is noted that the RLC analyzing section judges whether it is control information to be transmitted to the PDCP analyzing section. When it is decided that it is control information to be transmitted to the PDCP analyzing section, data including the control information is transmitted to the PDCP analyzing section.

Although the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A radio communication system according to a radio communication protocol, the radio communication system comprising:
a first radio communication apparatus configured to:
when pieces of control information, each of which is to be attached to data at each of logical channels, have a same content at an upper layer than a MAC layer of the radio communication protocol in the radio transmitting apparatus, integrate the pieces of data which have been received via the logical channels into one piece of data and attach one piece of control information having the same content as the pieces of control information to the one piece of data which has been integrated, and
transmit the one piece of data attached with the one piece of control information to a lower layer than the MAC layer; and
a second radio communication apparatus configured to receive the one piece of data attached with the one piece of control information from the first radio communication apparatus.

2. A radio communication method according to a radio communication protocol, the radio communication method comprising:
when pieces of control information, each of which is to be attached to data at each of logical channels, have a same content at an upper layer than a MAC layer of the radio communication protocol in the radio transmitting apparatus, by a first communication apparatus, integrating the pieces of data which have been received via the logical channels into one piece of data and attach one piece of control information having the same content as the pieces of control information to the one piece of data which has been integrated;

by the first communication apparatus, transmitting the one piece of data attached with the one piece of control information to a lower layer than the MAC layer; and by a second radio communication apparatus, receiving the one piece of data attached with the one piece of control information from the first radio communication apparatus.

* * * * *